United States Patent

[11] 3,576,240

| [72] | Inventor | John A. Nicholson |
| | | 1650 Carroll Ave., St. Paul, Minn. 55104 |
| [21] | Appl. No. | 844,980 |
| [22] | Filed | July 25, 1969 |
| [45] | Patented | Apr. 27, 1971 |

[54] CONTROL LEVER LOCKING DEVICE
3 Claims, 6 Drawing Figs.

[52] U.S. Cl. ................................................... 192/16,
192/17(R), 192/44
[51] Int. Cl. .................................................... F16d 67/02,
F16d 41/07
[50] Field of Search ........................................... 192/8, 12
(B), 16, 17, 19, 38, 44

[56] References Cited
UNITED STATES PATENTS
275,388  4/1883  Huyck ........................... 192/44

| 1,015,861 | 1/1912 | Warner ........................ | 192/8 |
| 2,066,167 | 12/1936 | Swartz ........................ | 192/44(X) |
| 2,076,828 | 4/1937 | Swartz ........................ | 192/8 |
| 3,008,346 | 11/1961 | Kratville ..................... | 192/8(X) |
| 3,119,480 | 1/1964 | Fuchs ......................... | 192/44 |
| 3,243,023 | 3/1966 | Boyden ........................ | 192/44 |

*Primary Examiner*—Allan D. Herrmann
*Attorney*—Robert M. Dunning

ABSTRACT: A control lever is pivotally supported for movement through 360°, and to cause corresponding pivotal movement of an arm connected by suitable linkage to a member to be controlled, such as an engine throttle. While the control lever is readily pivotal, any force on the arm tending to rotate it in either direction will lock the arm from rotation.

PATENTED APR 27 1971 3,576,240
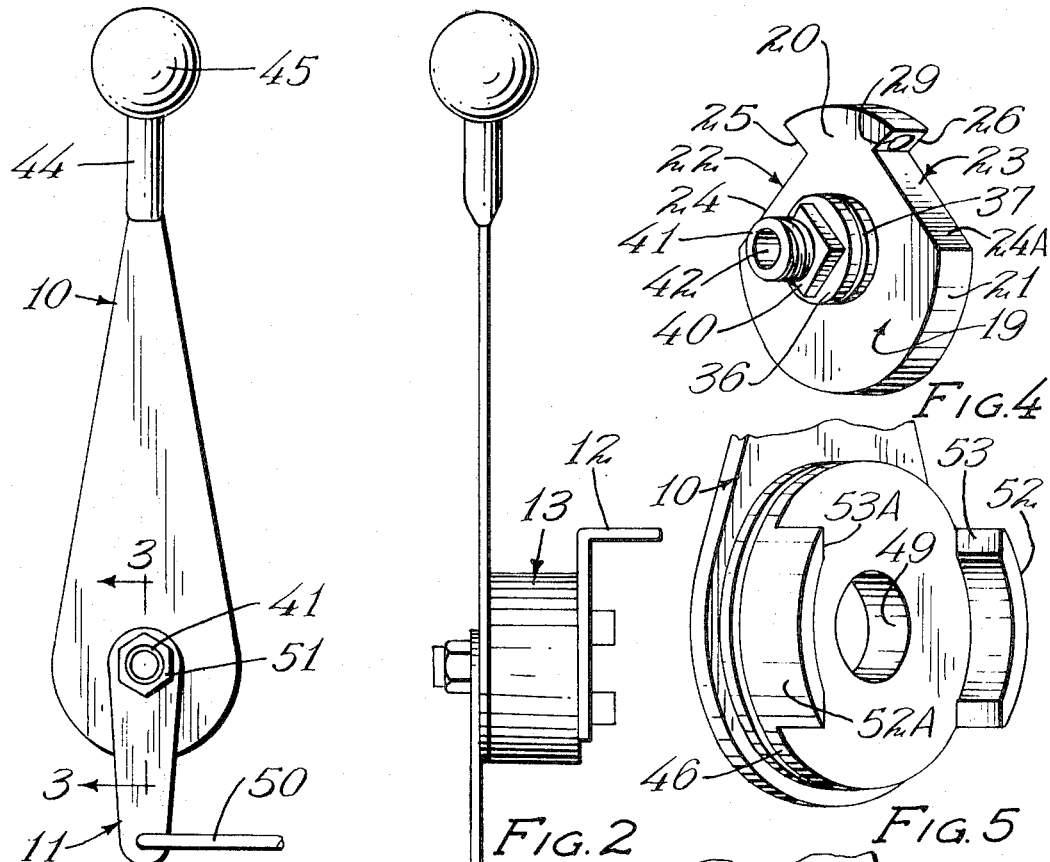
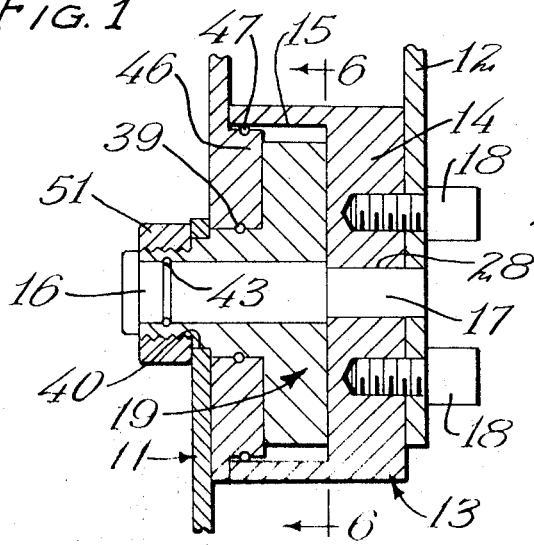
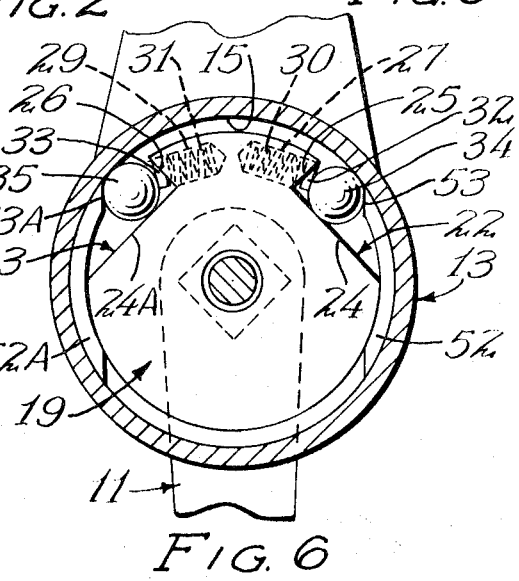
INVENTOR
JOHN A. NICHOLSON
BY Robert M. Dunning
ATTORNEY

CONTROL LEVER LOCKING DEVICE

This invention relates to an improvement in control lever locking device and deals particularly with a control lever which may be used to control the speed of an internal combustion engine, or any other such device, and yet at the same time will remain in a set position and will resist reverse forces tending to change the position of the lever.

Control levers are normally used to control internal combustion engines, and countless other devices. Means are often provided for holding the control lever in an adjusted position so that reverse forces acting against the lever will not change the adjustment. In the present description, the control lever is described as adjusting the throttle lever of an internal combustion engine, although it will be understood that this is merely cited for the purpose of description. In this arrangement, the control lever may be set at a desired position to adjust the throttle lever of the engine to provide a desired speed. The vibration of the engine has a tendency to work in a reverse direction to change the position of the lever and correspondingly change the engine speed. In the present invention, once the control lever has been positioned at a certain setting, the force acting in a reverse direction to change the position of the lever cannot do so. As a result, the engine will continue to operate at the set speed until the speed is again adjusted by the control lever.

The present invention resides in the provision of a device which may be produced at a reasonable cost, and which is extremely effective in retaining the predetermined lever position. The control lever may be easily operated, and may be readily moved to any adjusted position. At the same time, a tremendous reverse force would be required to change the angular position of the control lever, this force usually being in excess of the force necessary to break or bend the control linkage.

A further feature of the present invention resides in the provision of a control lever which may operate through an angle of 360° if desired, and which will remain fixed in an adjusted position.

These and other objects and novel features of the present invention will be more clearly and fully set forth in the following specification and claims.

In the drawings forming a part of the specification:

FIG. 1 is a front elevational view of a control lever, showing the general arrangement of parts therein.

FIG. 2 is a side elevational view of the structure shown in FIG. 1.

FIG. 3 is a sectional view of the apparatus, the position of the section being indicated by the line 3–3 of FIG. 1.

FIG. 4 is a perspective view of a portion of the device.

FIG. 5 is a perspective view of another portion of the device.

FIG. 6 is a sectional view through the apparatus, the position of the section being indicated by the line 6–6 of FIG. 3.

While the present device may vary quite considerably in its general form and shape, it is shown in its simplified form in FIGS. 1 and 2 of the drawings. These FIGS. illustrate a control lever 10 by means of which an arm 11 may be rotated. The purpose of the arrangement is to permit ready adjustment of the arm 11 into any angular position by the control lever 10, but to lock the lever 11 from movement due to external forces. In other words, the control lever 10 is readily adjustable about its axis when moved. However, the lever 11 will not rotate about the same axis when turning pressure is applied thereto, even though considerable force may be applied.

In general, the device includes a mounting bracket 12 which is secured to any fixed surface. In the present arrangement, the control lever 10 is used to control the position of the throttle of an internal combustion engine which is not illustrated in the drawings. The bracket 12 is secured to a cylindrical housing 13 by bolts 18 or other suitable means. Thus the housing 13 is fixed and secured from rotation. Obviously, the bracket 12 may be a part of the housing 13 or may be otherwise fixed thereto, if it is so desired.

The housing 13 is generally cylindrical and includes an end plate 14 which is attached to the bracket 12, and the housing includes a cylindrical socket 15 in its exposed face. A pivot pin 16 is provided with a small-diameter end 17 which is supported in an axial aperture 28 in the housing end plate 14. A clutch member 19 is rotatably mounted upon the pivot 16 within the cylindrical socket 15.

The clutch member 19 is perhaps best illustrated in FIG. 4 of the drawings. As indicated, the clutch member 19 comprises in general a disc-shaped body 20 having a cylindrical outer surface 21 which is interrupted by a pair of opposed notches 22 and 23. The notches 22 and 23 include surfaces 24 and 24A, respectively, which are on planes substantially normal to a radial plane through the axis of the disc 19. The notches terminate in substantially right angularly extending shoulders, these shoulders being identified by the numerals 25 and 26.

As is indicated in FIG. 6 of the drawings, sockets 27 and 29 extend into the shoulders or abutments 25 and 26 to accommodate springs 30 and 31 respectively. The springs 30 and 31 engage the bases of the sockets 27 and 29 and tend to urge plungers 32 and 33 outwardly against cylindrical rollers 34 and 35 respectively. These rollers 34 and 35 are located in the notches 22 and 23 respectively, and are thus positioned between the clutch member 19 and the inner periphery of the cylindrical socket 15.

The clutch member 19 is provided with an axial boss 36 which is grooved as indicated at 37 to accommodate an O-ring or sealing ring 39. A multisided axial projection 40 is provided on the cylindrical boss 36 to project outwardly therefrom, and the boss terminates in a shank 41 which is externally threaded. The boss 36 including the projection 40 and the threaded shank 41 is axially apertured as indicated at 42 to accommodate the pivot pin 16. A sealing ring 43 encircles the pin to seal the pin relative to the aperture 42.

The operating handle 10 is shown as having a cylindrical extension 44 terminating in a knob or handle 45 by means of which the operating arm 10 may be engaged and rotated. The handle 10 is provided with an axially projecting cylindrical sleeve 46 of proper dimension to fit within the cylindrical socket 15 of the housing 13. A sealing ring 47 is provided to seal the ring 46 relative to the wall 13 of the socket 15.

The arm 10 and the boss 46 are apertured as indicated at 49 to encircle the boss 36 of the clutch member 19. Thus the arm 10 is freely rotatable within the housing member 14, and is capable of being rotated through an angle of 360°, the linkage connecting the member to the device to be controlled being the controlling factor. FIG. 1 of the drawings discloses a link 50 connected to the arm 11 for controlling the throttle of the internal combustion engine or any other suitable means.

The lever 11 is mounted upon the multisided projection 40 of the boss 36, and accordingly, the lever 11 rotates in conjunction with the boss 36 and the clutch member 19. A nut 51 threaded upon the externally threaded projection 41 holds the lever 11 in its assembled position.

As indicated in FIG. 5 of the drawings, the boss 46 is provided with a pair of diametrically opposed arcuate segments 52 and 52A which are arranged to fit between the outer cylindrical surface of the clutch member 19 and the inner coaxial cylindrical surface of the socket 15. The ends 53 and 53A of these arcuate segments 52 and 52A are shaped to bear against the rollers 34 and 35, and to normally tend to urge the rollers 34 and 35 inwardly or away from the inner cylindrical socket surface of the socket 15 when moved against the rollers. The ends 53 and 53A of the arcuate segments 52 and 52A are generally on a plane normal to a radial plane through the axis of rotation and extending through the centers of the segments 52 and 52A. The ends 53 and 53A tend to urge the rollers inwardly toward the axis.

With reference to FIG. 6 of the drawings, rotation of the control lever 10 in a clockwise direction will cause the upper end 53A of the left-hand arcuate segment 52A to engage the roller 35, forcing this roller against the left-hand notch shoulder 26. This action rotates the clutch member 19 in a clockwise direction, and causes corresponding rotation of the arm 11 connected thereto. The right-hand roller 34 is in the deep end of the notch 22, and caused no interference with the rotative movement.

When the control lever is rotated in a counterclockwise direction, the end 53 of the right-hand arcuate segment 52 engages the roller 34 and forces it against the shoulder 25, to rotate the clutch element in unison therewith. The roller 35 rides in the deep end of the notch 23 and does not interfere with rotation.

When a force is exerted upon the arm 11 tending to rotate the clutch unit 19 in a clockwise direction, the roller 35 wedges between the inclined base 24A of the notch 23 and the inner cylindrical surface of the socket 15, of the fixed housing 13, locking the clutch member 19 from further movement. A force tending to rotate the arm 11 in a counterclockwise direction will wedge the roller 34 between the inclined base 24 of notch 22 and the cylindrical wall of the socket, locking the clutch member from movement.

The clutch member 19 thus combines with the cylindrical socket wall 15 of the fixed housing 13 to provide a double-acting clutch which would normally prevent any relative rotation between the clutch element and the housing in either direction when the rotative force acts upon the arm 11. The arcuate segments 52 and 52A on the control lever 10 merely inactivate the wedging between the bases of the notches 22 and 23 and the socket wall. Due to the fact that tolerances are closely maintained, the angular rotation of the arm 11 necessary to lock the clutch from rotation is extremely small. While the control lever 10 may be rotated in either direction with little effort, the force locking the arm from being rotated increases in proportion to the force applied.

I claim:

1. A control device for controlling the position of linkage and the like in which the linkage may be readily actuated by a control lever, but in which a tendency to move the linkage cannot move the control lever, the device including:

a fixed housing including a socket having a cylindrical inner surface;

a shaft supported concentrically with said cylindrical inner surface within said socket;

a clutch member having a hub supported on said shaft and a cylindrical outer surface concentric with, and spaced from, said cylindrical inner surface of said housing;

said clutch member having a pair of notches in spaced relation in its peripheral cylindrical surface, said notches being of greatest depth at their adjacent ends and inclining toward the cylindrical outer surface;

a sector-shaped area of said clutch member being located between the ends of said notches of greatest depth;

a ring-shaped sleeve extending into said socket and sealed relative thereto, and sealed relative to said clutch member hub;

a clutch ball in each of said notches between said clutch member and the inner cylindrical surface of said fixed housing, rotation of said clutch member in either direction engaging one of said rollers with said inner cylindrical surface of said fixed housing;

a control lever secured to said ring-shaped sleeve for rotation therewith;

a pair of opposed arcuate projections on said sleeve and movable between the outer cylindrical surface of said clutch member and the inner cylindrical surface of said fixed housing;

said arcuate projections having inclined ends engageable with a corresponding one of said rollers to urge the roller toward the greatest depth end of its notch; and an arm secured to said hub outwardly of said control lever and rotatable with said clutch member, said arm being adaptable for attachment to the linkage.

2. The structure of claim 1 and including a nut threaded on said hub to hold the arm connected to the hub.

3. The structure of claim 1 and including a pair of springs extending into sockets extending into the sector-shaped area of the clutch and interposed between the bases of these sockets and said clutch balls.